US012437688B1

(12) United States Patent
Komuro et al.

(10) Patent No.: US 12,437,688 B1
(45) Date of Patent: Oct. 7, 2025

(54) PROJECTION-TYPE DISPLAY APPARATUS

(71) Applicant: SEIKO EPSON CORPORATION, Tokyo (JP)

(72) Inventors: Yusuke Komuro, Azumino (JP); Kazuhisa Mizusako, Shiojiri (JP); Toru Aoki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/619,364

(22) Filed: Mar. 28, 2024

(30) Foreign Application Priority Data

Mar. 29, 2023 (JP) ................................ 2023-052995

(51) Int. Cl.
*G09G 3/36* (2006.01)
*G09G 3/00* (2006.01)
*G09G 3/20* (2006.01)

(52) U.S. Cl.
CPC ........... *G09G 3/007* (2013.01); *G09G 3/2007* (2013.01); *G09G 3/3648* (2013.01); *G09G 2310/08* (2013.01); *G09G 2320/0233* (2013.01); *G09G 2320/0247* (2013.01); *G09G 2340/16* (2013.01)

(58) Field of Classification Search
CPC .... G09G 3/007; G09G 3/2007; G09G 3/3648; G09G 2310/08; G09G 2320/0233; G09G 2320/0247; G09G 2340/16
See application file for complete search history.

(56) References Cited

U.S. PATENT DOCUMENTS

| | | | | |
|---|---|---|---|---|
| 7,936,325 B2 * | 5/2011 | Miyata | G09G 3/3648 | 345/87 |
| 12,198,587 B2 * | 1/2025 | Aoki | G09G 3/007 | |
| 12,211,409 B2 * | 1/2025 | Aoki | G09G 3/007 | |
| 12,260,795 B2 * | 3/2025 | Aoki | G09G 3/36 | |
| 2010/0091033 A1 * | 4/2010 | Itoyama | G09G 3/2092 | 345/600 |
| 2010/0290532 A1 * | 11/2010 | Yamamoto | H04N 19/117 | 375/E7.123 |
| 2020/0213567 A1 * | 7/2020 | Okada | H04N 9/3188 | |
| 2021/0076015 A1 * | 3/2021 | Hosaka | G09G 3/002 | |
| 2024/0071270 A1 * | 2/2024 | Aoki | G09G 3/002 | |
| 2024/0071271 A1 * | 2/2024 | Aoki | G09G 3/002 | |
| 2024/0321159 A1 * | 9/2024 | Mizusako | G09G 3/007 | |
| 2024/0331600 A1 * | 10/2024 | Aoki | G09G 3/007 | |
| 2025/0139969 A1 * | 5/2025 | Fogg | G06V 20/47 | |

FOREIGN PATENT DOCUMENTS

| | | |
|---|---|---|
| JP | 2020-107984 A | 7/2020 |
| JP | 2021-039289 A | 3/2021 |

* cited by examiner

*Primary Examiner* — Ke Xiao
*Assistant Examiner* — Jennifer L Zubajlo
(74) *Attorney, Agent, or Firm* — Oliff PLC

(57) ABSTRACT

A projection-type display apparatus includes a liquid crystal panel, an optical path shift element, and a display control circuit that controls the liquid crystal panel and the optical path shift element. When a difference in gray scale level between pixel data corresponding to a panel pixel p11 and pixel data corresponding to a panel pixel p12, the panel pixel p11 and the panel pixel p12 being two adjacent pixels, is equal to or larger than a threshold in a unit period 1-2 for example, the display control circuit corrects at least one of a gray scale level of a video pixel corresponding to the panel pixel p12 in a previous unit period 1-1 or a gray scale level of a video pixel corresponding to the panel pixel p11 in a unit period 2-1 to reduce a difference in luminance between the panel pixels.

7 Claims, 12 Drawing Sheets

FIG. 11
• Odd Frame
Bk1
A11
B11
A21
D11
C11
D21
A12
B12
A22
• Even Frame
A11
B11
A21
D11
C11
D21
A12
B12
A22
Bk2

PROJECTION-TYPE DISPLAY APPARATUS

The present application is based on, and claims priority from JP Application Serial Number 2023-052995, filed Mar. 29, 2023, the disclosure of which is hereby incorporated by reference herein in its entirety.

BACKGROUND

1. Technical Field

The present disclosure relates to a projection-type display apparatus.

2. Related Art

There has been known a technique of achieving pseudo improvement in resolution using an optical path shift element for a projection-type display apparatus that projects image light generated by a liquid crystal panel or the like onto a screen or the like. More specifically, in the projection-type display apparatus, one frame period is divided into a plurality of unit periods. A projection position of one panel pixel in the liquid crystal panel is shifted for each of the plurality of unit periods. Thus, gray scale levels designated by a plurality of pieces of pixel data in video data is expressed (see JP-A-2020-107984, for example).

However, with the above-described technique, when panel pixels respectively applying high voltage and low voltage to liquid crystal elements are arranged adjacent to each other in one unit period, flickering occurs after the unit period due to resultant alignment defect.

SUMMARY

A projection-type display apparatus according to one aspect (Aspect 1) of the present disclosure for solving the problem described above includes a liquid crystal panel including a panel pixel, an optical path shift element configured to shift a position of a projection pixel every k unit periods, from a first unit period to a k-th unit period, included in one frame period, the projection pixel being projected from the panel pixel, k being an integer of 2 or greater, and a display control circuit configured to control the liquid crystal panel and the optical path shift element, wherein the display control circuit is configured to supply a data signal corresponding to a gray scale level designated by pixel data forming video data to the panel pixel for each unit period, control the optical path shift element to shift the position of the projection pixel for each unit period, control the optical path shift element so that a position of the projection pixel in a first frame period and a position of the projection pixel in a second frame period after the first frame period include different positions, and when in the first frame period, a difference in gray scale level between pixel data corresponding to a first panel pixel and pixel data corresponding to a second panel pixel is equal to or larger than a threshold in one unit period, the first panel pixel and the second panel pixel being adjacent to each other, correct at least one of a gray scale level of first pixel data corresponding to the first panel pixel in a unit period subsequent to the one unit period or a gray scale level of second pixel data corresponding to a panel pixel to which the first pixel data is supplied in the second frame period, so as to reduce a difference in luminance between a panel pixel to which the first pixel data is supplied in the subsequent unit period and a panel pixel to which the second pixel data is supplied in the second frame period.

BRIEF DESCRIPTION OF THE DRAWINGS

FIG. 9 is a diagram illustrating a relationship between an array of pixel data and an array of panel pixels, and the like.

DESCRIPTION OF EMBODIMENTS

An electro-optical device according to an embodiment will be described below with reference to the drawings. In each of the drawings, dimensions and scale of each part are appropriately different from actual ones. Moreover, the embodiment described below is a suitable specific example, and various technically preferable limitations are applied, but the scope of the disclosure is not limited to these modes unless they are specifically described in the following description as limiting the disclosure.

Figure 1:
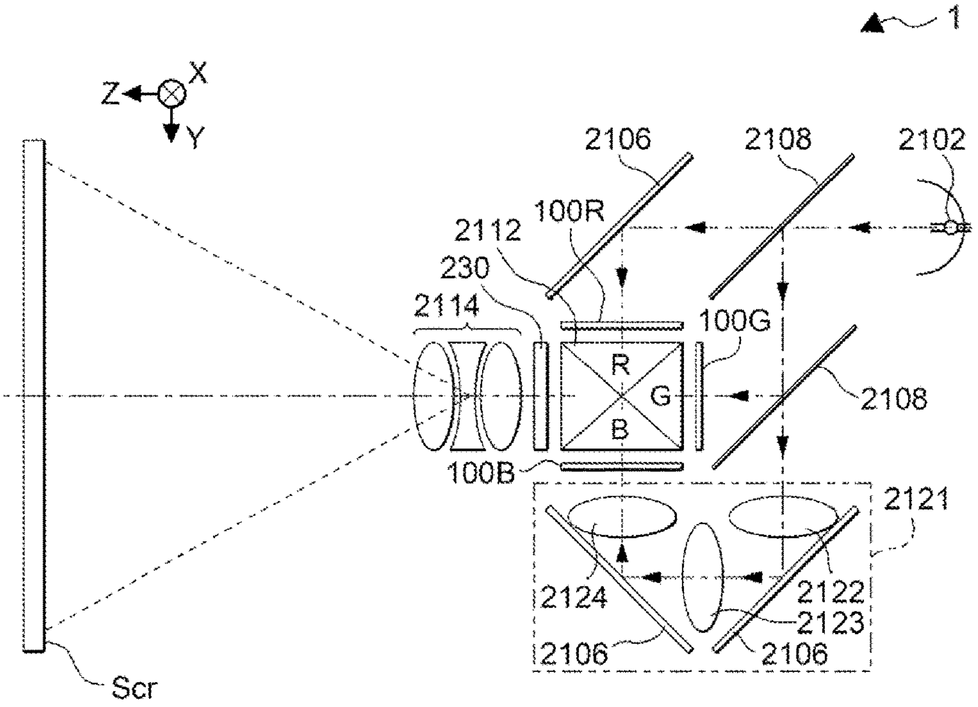
FIG. 1 is a diagram illustrating a projection-type display apparatus according to an embodiment.

FIG. 1 is a diagram illustrating an optical configuration of a projection-type display apparatus 1 according to an embodiment. As illustrated in the drawing, the projection-type display apparatus 1 includes liquid crystal panels 100R, 100G, and 100B. A lamp unit 2102 including a white light source such as a halogen lamp is provided inside the projection-type display apparatus 1. Projection light emitted from the lamp unit 2102 is split into three primary colors of red (R), green (G), and blue (B) by three mirrors 2106 and two dichroic mirrors 2108 disposed inside the projection-type display apparatus 1. Of the light of the primary colors, light of R, light of G, and light of B are incident on the liquid crystal panel 100R, the liquid crystal panel 100G, and the liquid crystal panel 100B, respectively.

Note that since an optical path for B is longer than each of optical paths for R and G. Thus, a loss in the B optical path needs to be prevented. Thus, the optical path for B is provided with a relay lens system 2121 including an incidence lens 2122, a relay lens 2123, and an emission lens 2124.

The liquid crystal panel 100R includes a plurality of pixel circuits. Each of the plurality of pixel circuits includes a liquid crystal element. As described below, the liquid crystal element of the liquid crystal panel 100R driven based on a data signal corresponding to R, to have a transmittance corresponding to the voltage of the data signal. Thus, in the liquid crystal panel 100R, a transmitted image of R is generated with the transmittance of the liquid crystal element individually controlled. Similarly, in the liquid crystal panel 100G, a transmitted image of G is generated based on a data signal corresponding to G, and in the liquid crystal panel 100B, a transmitted image of B is generated based on a data signal corresponding to B.

The transmitted images of respective colors respectively generated by the liquid crystal panels 100R, 100G, and 100B, are incident on a dichroic prism 2112 from three directions. In the dichroic prism 2112, the light of R and the light of B are refracted at 90 degrees, whereas the light of G travels straight. Thus, the dichroic prism 2112 combines the images of the respective colors. The composite image generated by the dichroic prism 2112 is incident on a projection lens 2114 through an optical path shift element 230.

The projection lens 2114 enlarges and projects the composite image transmitted through the optical path shift element 230, onto a screen Scr.

The optical path shift element 230 shifts the composite image emitted from the dichroic prism 2112. More specifically, the optical path shift element 230 shifts the image projected onto the screen Scr in the left-right direction and/or in the up-down direction with respect to a projection surface.

Note that, the transmitted images from the liquid crystal panels 100R and 100B are projected after being reflected by the dichroic prism 2112, whereas the transmitted image from the liquid crystal panel 100G travels straight to be projected. Thus, the transmitted images respectively from the liquid crystal panels 100R and 100B are laterally inverted with respect to the transmitted image from the liquid crystal panel 100G.

For convenience of description, with the projection surface of the screen Scr viewed from the projection-type display apparatus 1, the left-right direction is defined as an X-axis and the up-down direction is defined as a Y-axis. Note that, of the left-right directions along the X-axis, the right direction is referred to as an X direction, and the left direction is referred to as a direction opposite to the X direction. Further, of the up-down directions along the Y-axis, the downward direction is referred to as a Y direction, and the upward direction is referred to as a direction opposite to the Y direction. The projection direction of the projection-type display apparatus 1 is defined as a Z direction.

Figure 2:
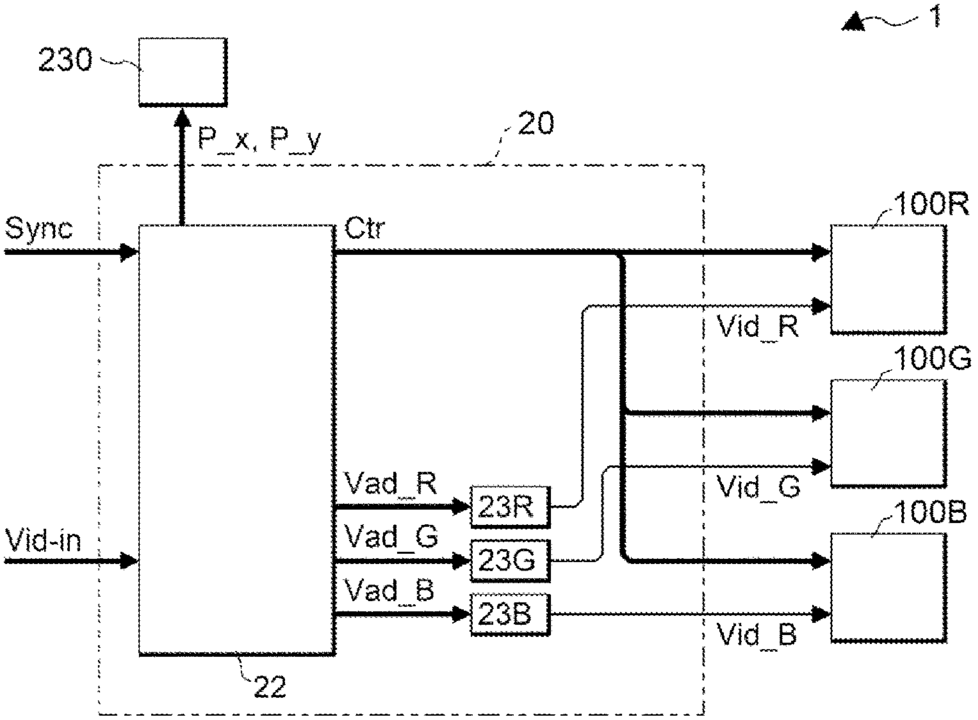
FIG. 2 is a block diagram illustrating a configuration of the projection-type display apparatus.

FIG. 2 is a block diagram illustrating an electrical configuration of the projection-type display apparatus 1. As illustrated in the drawing, the projection-type display apparatus 1 includes a display control circuit 20, as well as the liquid crystal panels 100R, 100G, and 100B, and the optical path shift element 230 described above.

Video data Vid-in is supplied from a higher-level device such as a host device (not illustrated) in synchronization with a synchronization signal Sync. The video data Vid-in designates a gray scale level of a pixel in an image to be displayed for each of RGB, for example, by 8 bits.

Note that the pixel in the image designated by the video data Vid-in is referred to as a video pixel, data designating the gray scale level of the video pixel is referred to as pixel data, and the pixel in the composite image obtained with the liquid crystal panels 100R, 100G, and 100B is referred to as a panel pixel. Further, the position of the panel pixel shifted by the optical path shift element 230 and projected onto the screen Scr is referred to as a projection position.

In the composite image obtained with the liquid crystal panels 100R, 100G, and 100B, the panel pixels are arrayed in a matrix in the vertical direction and the lateral direction. In the present embodiment, the array of the video pixels whose gray scale levels are designated by the video data Vid-in is, for example, twice as large as the array of the panel pixels as a result of combining by the liquid crystal panel 100R, 100G, or 100B, in both the vertical direction and the lateral direction.

In the present embodiment, a color image projected onto the screen Scr is expressed by combining the transmitted images respectively from the liquid crystal panels 100R, 100G, and 100B. Thus, the pixel, which is the minimum unit of the color image, can be classified into a red sub-pixel corresponding to the liquid crystal panel 100R, a green sub-pixel corresponding to the liquid crystal panel 100G, and a blue sub-pixel corresponding to the liquid crystal panel 100B. However, when there is no need to specify the colors of the sub-pixels in the liquid crystal panels 100R, 100G, and 100B, or, for example, when the brightness is simply the problem, there is no need to use the term sub-pixel in the first place. Therefore, in the description herein, the panel pixel is also used as a unit of displaying by the liquid crystal panels 100R, 100G, and 100B.

The synchronization signal Sync includes a vertical synchronization signal that instructs a start of vertical scanning of the video data Vid-in, a horizontal synchronization signal that instructs a start of horizontal scanning, and a clock signal that indicates a timing for one video pixel in the video data Vid-in.

The display control circuit 20 includes a processing circuit 22, and conversion circuits 23R, 23G, and 23B.

The processing circuit 22 accumulates the video data Vid-in supplied from a higher-level device for one or two or more frame periods, performs determination to be described later, and corrects the pixel data in accordance with the determination described below. The processing circuit 22 outputs the corrected pixel data of the video pixel corresponding to the projection position achieved by the optical path shift element 230, for each of RGB components. Note that, of the pixel data output from the processing circuit 22, the R component is denoted as pixel data Vad_R, the G component is denoted as pixel data Vad_G, and the B component is denoted as pixel data Vad_B.

In the projection-type display apparatus 1, the projection position changes for each unit period obtained by dividing one frame period into four. Thus, eight projection positions can be obtained in eight unit periods in two consecutive frame periods. However, in the present embodiment, the number of projection positions in the eight unit periods is set to be seven, as will be described below.

Each of the unit periods is a period in which a user visually recognizes an image as a result of reducing the resolution of an image for one frame period, designated by the video data Vid-in, to one fourth of the original resolution, as the composite image obtained by the liquid crystal panels 100R, 100G, and 100B.

The processing circuit 22 controls the projection position achieved by the optical path shift element 230 in each unit period. Specifically, the processing circuit 22 performs control, for the optical path shift element 230, using a control signal P_x for a shift in a direction along the X-axis, and using a control signal P_y for a shift in a direction along the Y-axis.

Note that the projection position in each unit period, and which of the video pixels, designated by the video data Vid-in in correspondence to each projection position, is expressed by the panel pixel will be described below in more detail.

Further, the processing circuit 22 also generates a control signal Ctr for controlling the liquid crystal panels 100R, 100G, and 100B in each unit period.

The conversion circuit 23R converts the pixel data Vad_R into a data signal Vid R of an analog voltage, and supplies the signal to the liquid crystal panel 100R. The conversion circuit 23G converts the pixel data Vad_G into a data signal Vid G of an analog voltage, and supplies the signal to the liquid crystal panel 100G. The conversion circuit 23B converts the pixel data Vad_B into a data signal Vid B of an analog voltage, and supplies the signal to the liquid crystal panel 100B.

Next, the liquid crystal panels 100R, 100G, and 100B will be described. The liquid crystal panels 100R, 100G, and 100B only differ in the color, that is, the wavelength of incident light, and otherwise have the same structure. Thus, the liquid crystal panels 100R, 100G, and 100B will be collectively described below using a reference numeral 100 without specifying the color.

Figure 3:
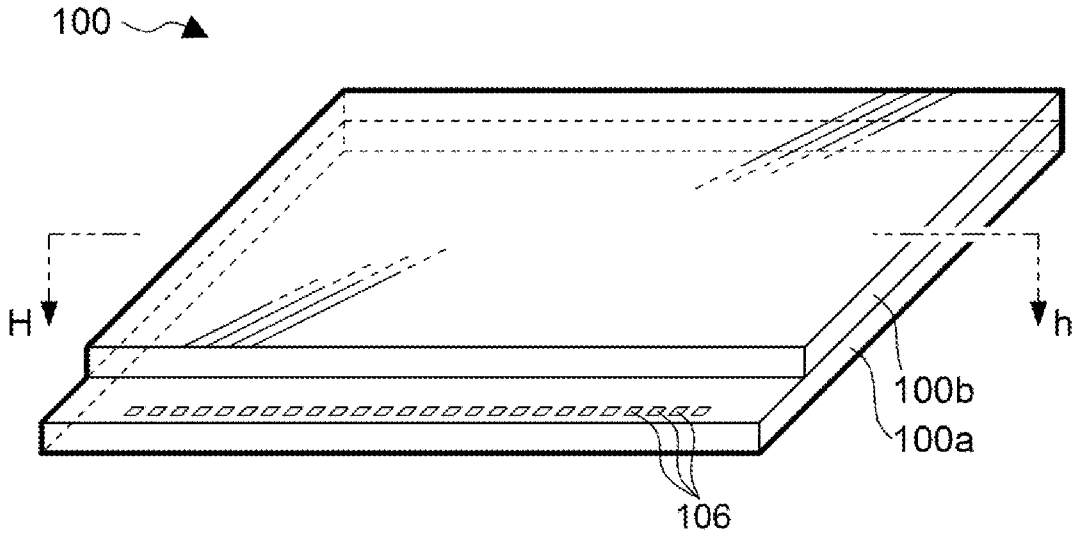
FIG. 3 is a perspective view illustrating a configuration of a liquid crystal panel of the projection-type display apparatus.
Figure 4:
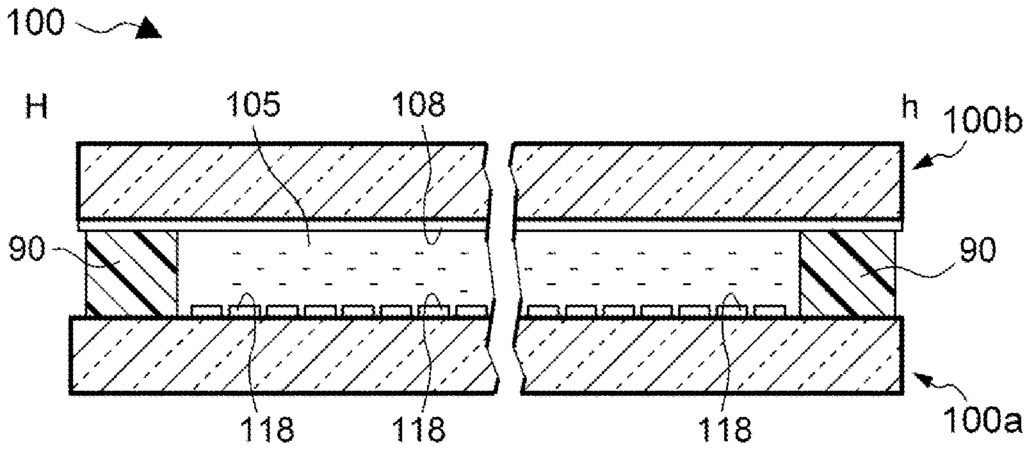
FIG. 4 is a cross-sectional view illustrating a structure of the liquid crystal panel.

FIG. 3 is a diagram illustrating a main portion of the liquid crystal panel 100, and FIG. 4 is a cross-sectional view taken along line H-h in FIG. 3.

As illustrated in these drawings, in the liquid crystal panel 100, an element substrate 100*a* provided with pixel electrodes 118 and a counter substrate 100*b* provided with a common electrode 108 is provided are bonded to each other by a seal material 90, with their electrode-formed surfaces facing each other with a constant gap maintained in between. A liquid crystal 105 is sealed in the gap.

As the element substrate 100*a* and the counter substrate 100*b*, transparent substrates such as glass or quartz substrates are used. As illustrated in FIG. 3, one side of the element substrate 100*a* protrudes beyond the counter substrate 100*b*. In this protruding region, a plurality of terminals 106 are provided along the lateral direction in the drawing. One end of a flexible printed circuit (FPC) substrate (not illustrated) is coupled to the plurality of terminals 106. Note that the other end of the FPC substrate is coupled to the display control circuit 20, and the above-described various signals and the like are supplied thereto.

On the surface of the element substrate 100*a* facing the counter substrate 100*b*, the pixel electrodes 118 are formed by patterning a transparent conductive layer such as indium tin oxide (ITO), for example.

Further, various elements other than the electrodes are provided on the facing surfaces of the element substrate 100*a* and the counter substrate 100*b*, but are not illustrated in the drawings.

Figure 5:
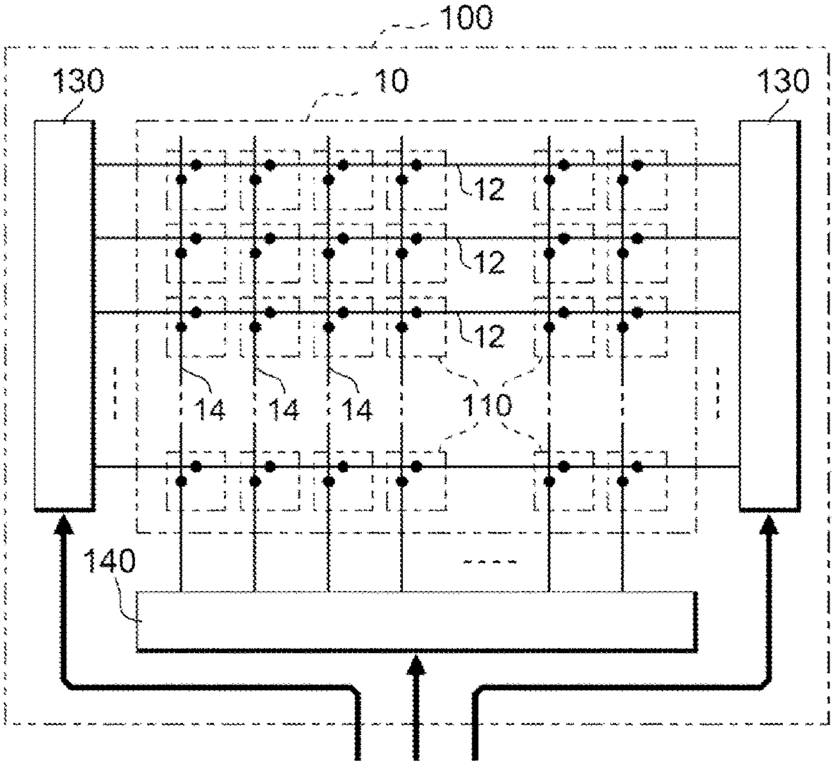
FIG. 5 is a block diagram illustrating an electrical configuration of the liquid crystal panel.

FIG. 5 is a block diagram illustrating an electrical configuration of the liquid crystal panel 100. In the liquid crystal panel 100, a scanning line drive circuits 130 and a data line drive circuit 140 are provided at the periphery of a display region 10.

In the display region 10 of the liquid crystal panel 100, pixel circuits 110 are arrayed in matrix. More specifically, in the display region 10, a plurality of scanning lines 12 are provided extending in the lateral direction in the drawing, and a plurality of data lines 14 are provided extending in the vertical direction, while being electrically insulated from the scanning lines 12. The pixel circuits 110 are provided in a matrix corresponding to the intersections between the plurality of scanning lines 12 and the plurality of data lines 14.

The pixel circuits 110 are arrayed in a matrix of m rows×n columns, where m represents the number of the scanning lines 12 and n represents the number of the data lines 14. Note that m and n are each an integer of 2 or greater. Regarding the scanning lines 12 and the pixel circuits 110, for the distinction of the rows of the matrix, the rows may be referred as a first, second, third, . . . (m−1)-th, and m-th rows in order from the top in the drawing. Similarly, regarding the data lines 14 and the pixel circuits 110, for the distinction of the columns of the matrix, the columns may be referred as a first, second, third, . . . (n−1)-th, and n-th columns in order from the left in the drawing.

Under the control by the display control circuit 200, the scanning line drive circuit 130 selects the scanning lines 12 one by one, for example, in order of the first, second, third, . . . and m-th rows, and sets a scanning signal to the selected scanning line 12 to the H level. Note that the scanning line drive circuit 130 sets the scanning signals to the scanning lines 12 other than the selected scanning line 12, to the L level.

The data line drive circuit 140 latches one row of the data signals supplied from the circuit of the corresponding color, that is, from one of processing circuits 220R, 220G, or 220B, and in a period in which the scanning signal to the scanning line 12 is at the H level, outputs the data signal to the pixel circuit 110 located at that scanning line 12 via the data line 14.

Figure 6:
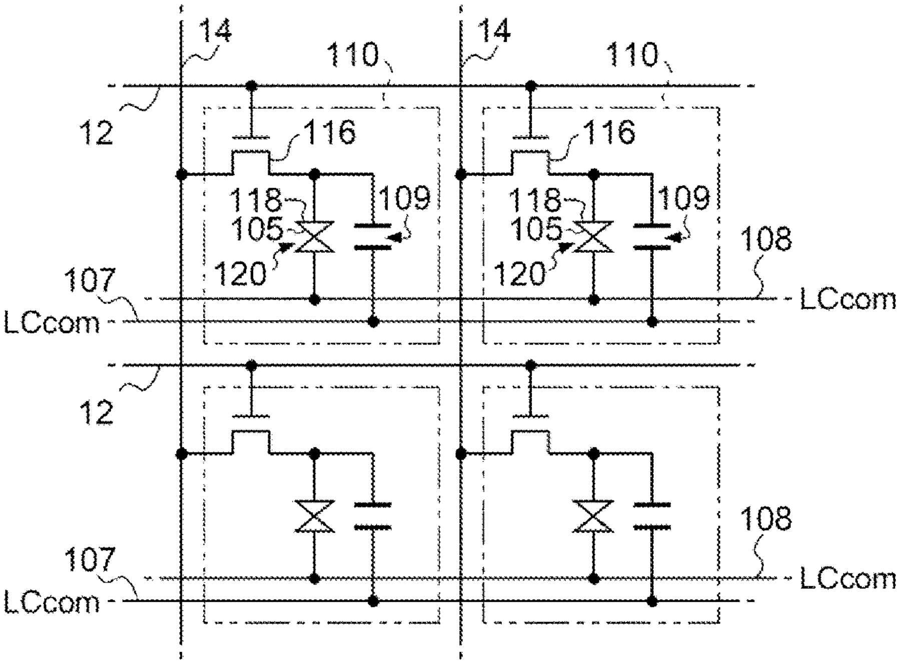
FIG. 6 is a diagram illustrating a configuration of a pixel circuit of the liquid crystal panel.

FIG. 6 is a diagram illustrating an equivalent circuit of a total of four of the pixel circuits 110, in two rows and two columns, corresponding to the intersections between two adjacent scanning lines 12 and two adjacent data lines 14.

As illustrated in the drawing, the pixel circuit 110 includes a transistor 116 and a liquid crystal element 120. The transistor 116 is, for example, an n-channel thin film transistor. In the pixel circuit 110, the transistor 116 has a gate node coupled to the scanning line 12, a source node coupled to the data line 14, and a drain node coupled to the pixel electrode 118 having a square shape in plan view.

The common electrode 108 is provided commonly for all of the pixels, so as to face the pixel electrodes 118. A voltage LCcom is applied to the common electrode 108. The liquid crystal 105 is interposed between the pixel electrodes 118 and the common electrode 108, as described above. Thus, the liquid crystal element 120, in which the liquid crystal 105 is interposed between the pixel electrodes 118 and the common electrode 108, is formed for each of the pixel circuits 110.

A storage capacitor 109 is provided in parallel with the liquid crystal element 120. The storage capacitor 109 has one end coupled to the pixel electrode 118, and has the other end coupled to a capacitor line 107. A temporally constant voltage, for example, the voltage LCcom that is the same as the voltage applied to the common electrode 108, is applied to the capacitor line 107. Since the pixel circuits 110 are arrayed in matrix in the lateral direction, which is the extending direction of the scanning lines 12, and in the vertical direction, which is the extending direction of the data lines 14, the pixel electrodes 118 included in the pixel circuits 110 are also arrayed in the lateral direction and the vertical direction.

In the scanning line 12 with the scanning signal at the H level, the transistor 116 of the pixel circuit 110 provided corresponding to that scanning line 12 is turned ON. Since the data line 14 and the pixel electrode 118 are electrically coupled to each other as a result of the transistor 116 turning ON, the data signal supplied to the data line 14 reaches the pixel electrode 118 via the transistor 116 that has turned ON. When the scanning line 12 is set to the L level, the transistor 116 is turned OFF, but the voltage of the data signal, which has reached the pixel electrode 118, is retained by capacitive properties of the liquid crystal element 120 and by the storage capacitor 109.

As is well known, in the liquid crystal element 120, the liquid crystal molecular alignment changes in accordance with the electric field generated by the pixel electrodes 118 and the common electrode 108. Thus, the liquid crystal element 120 has a transmittance corresponding to the effective value of the applied voltage.

Note that a region functioning as the pixel in the liquid crystal element 120, that is, a region having the transmittance corresponding to the effective value of the voltage is a region in which the pixel electrodes 118 and the common electrode 108 overlap each other in plan view of the element substrate 100*a* and the counter substrate 100*b*. Since the pixel electrode 118 has a square shape in plan view, the pixel of the liquid crystal panel 100 also has also square shape.

In the present embodiment, the liquid crystal 105 is of a vertical alignment (VA) type and is under a normally black mode in which the transmittance is the lowest when the voltage applied to the liquid crystal element 120 is zero and increases as the voltage applied to the liquid crystal element 120 increases.

An operation of supplying the data signal to the pixel electrode 118 of the liquid crystal element 120 is performed in order of the first, second, third, . . . and m-th rows in one unit period. As a result, a voltage corresponding to the data signal is retained in each of the liquid crystal elements 120 of the pixel circuits 110 arrayed in m rows and n columns, each a target transmittance of each of the liquid crystal element 120 is achieved, and the transmitted image of the corresponding color is generated by the liquid crystal elements 120 arrayed in m rows and n columns.

In this way, the transmitted image is generated for each of RGB, and the color image obtained by combining RGB is projected onto the screen Scr.

The pixel data Vad_R, Vad_G, and Vad_B of the video pixel output from the processing circuit 22 corresponding to one unit period is the pixel data of the video pixel corresponding to that unit period. Thus, in the unit period, a color composite image corresponding to a projection position is projected at the projection position.

As described above, the video pixels in the video data Vid-in are arrayed in 2*m* rows and 2*n* columns, which are twice as large in both the vertical direction and the lateral direction compared with the m rows and n columns in which the panel pixels are arrayed in the liquid crystal panels 100R, 100G, and 100B. In other words, the array of the panel pixels is half the size of the array of the video pixels in both the vertical direction and the lateral direction.

Thus, in the present embodiment, in one frame period, one panel pixel is shifted to a total of four positions, namely, two positions in the vertical direction×two positions in the lateral direction, so that the one panel pixel is visually recognized as if it is indicating four video pixels designated by the video data Vid-in.

However, in a configuration in which the video pixels are expressed by simply shifting one panel pixel to the four positions in one frame period, the display quality may be compromised as described below. Thus, in the present embodiment, the video pixel is expressed with the projection position of one panel pixel shifted in each of eight unit periods over two frame periods. Furthermore, the direction in which the projection position is shifted for each of the unit periods in an odd frame period and the direction in which the projection position is shifted for each of the unit periods in an even frame period are set to be opposite to each other.

Figure 7:
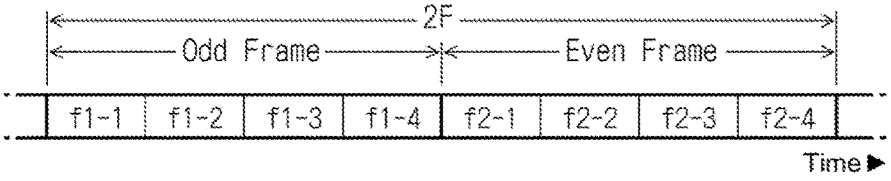
FIG. 7 is a diagram illustrating a frame period and a unit period in the projection-type display apparatus.

FIG. 7 is a diagram illustrating a relationship between a frame and a unit period according to the present embodiment. As illustrated in the drawing, in the present embodiment, a two frame (2F) period is divided into a preceding odd frame period and a succeeding even frame.

The odd frame period is divided into four unit periods. In order to distinguish the four unit periods in the odd frame period from each other, reference signs f1-1, f1-2, f1-3, and f1-4 are assigned in a chronological order for convenience. Similarly, the even frame period is divided into four unit periods. In order to distinguish the four unit periods in the even frame period from each other, reference signs f2-1, f2-2, f2-3, and f2-4 are assigned in a chronological order for convenience.

Note that the number of unit periods included in each of the odd frame period and the even frame period, which is "4" in this case, is an example of an integer k of 2 or greater. Further, the odd frame period is an example of a first frame period, and the even frame period is an example of a second frame period. The unit periods f1-1 and f2-1 are examples of a first unit period, the unit periods f1-2 and f2-2 are examples of a second unit period, the unit periods f1-3 and f2-3 are examples of a third unit period, and the unit periods f1-4 and f2-4 are examples of a fourth unit period.

One frame period is a period in which one frame of the image designated by the video data Vid-in from the higher-level device is supplied. When the frequency of the vertical synchronization signal included in the synchronization signal Sync is 60 Hz, one frame period is 16.7 milliseconds as one period. In this case, the length of each of the unit periods is ¼ of the length of the one frame period, which is 4.17 milliseconds.

Figure 8:
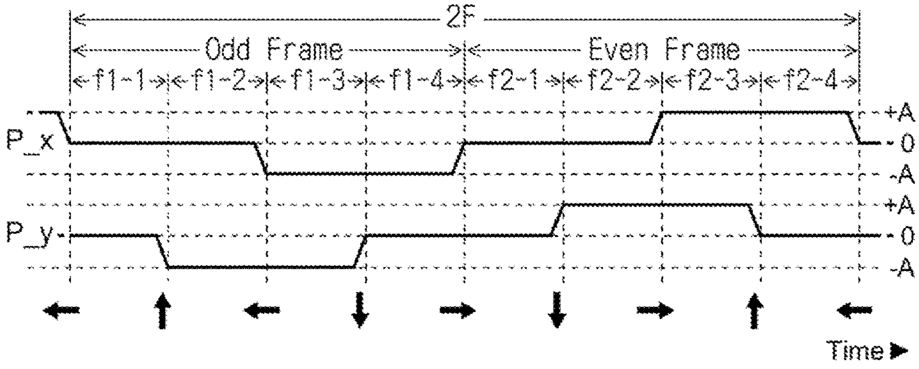
FIG. 8 is a diagram illustrating an operation of an optical path shift element.

FIG. 8 is a diagram illustrating an example of waveforms of the control signals P_x and P_y supplied to the optical path shift element 230.

The optical path shift element 230 shifts the image projected onto the screen Scr in the X-axis and the Y-axis with respect to the projection surface. For convenience, an amount of the shift will be described in terms of the size of the pixel projected onto the screen Scr, that is, the size of the panel pixel.

Each of the control signals P_x and P_y has a level of one of three values of +A, 0, and −A, except for during a rear end period of each of the unit periods f1-1 to f1-4 and f2-1 to f2-4. The levels of the control signals P_x and P_y change in the rear end period. The rear end period is a period corresponding to a vertical scanning flyback period.

Note that the level of the control signal P_x or P_y may be constant over two consecutive unit periods.

For convenience of description, the projection position in the period, other than the rear end period, of the unit period f1-1 in the odd frame period, that is, the projection position in the period in which the levels of the control signals P_x and P_y are 0 is defined as a reference position.

When the level of the control signal P_x is +A, the optical path shift element 230 shifts the projection position from the reference position by half of the panel pixel in the X direction, and when the level of the control signal P_x is −A, the optical path shift element 230 shifts the projection position from the reference position by half of the panel pixel in the direction opposite to the X direction.

When the level of the control signal P_y is +A, the optical path shift element 230 shifts the projection position from the reference position by half of the panel pixel in the Y direction, and when the level of the control signal P_y is −A, the optical path shift element 230 shifts the projection position from the reference position by half of the panel pixel in the direction opposite to the Y direction.

Thus, for example, when the level of the control signal P_x is +A and the level of the control signal P_y is +A, the optical path shift element 230 shifts the projection position from the reference position by half of the panel pixel in each of the X direction and the Y direction.

Note that the arrow illustrated in the rear end period of each of the unit periods in FIG. 8 indicates a direction in which the projection position is shifted when the levels of the control signals P_x and P_y are changed or maintained in that rear end period.

Further, the shift of the projection position by the optical path shift element 230 may not be performed according to the levels of the control signals P_x and P_y, and may involve a time delay.

Next, a description will be made as to which video pixel among the video pixels of the video data Vid-in is expressed by the panel pixel of the liquid crystal panel 100 in the odd frame period and the even frame period. Note that a panel pixel expressing a video pixel means that the panel pixel is made to be in a state of having luminance (brightness) corresponding to a gray scale level designated by the pixel data, by the data signal corresponding to that video pixel.

Figure 9:
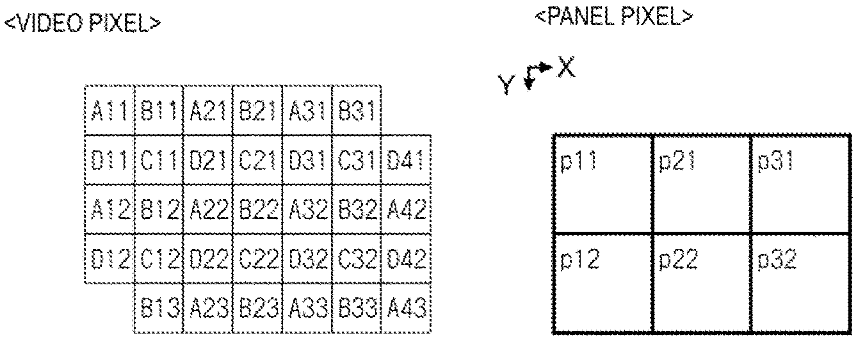

The left field in FIG. 9 is a diagram obtained by extracting only part of the video image designated by the video data Vid-in, in order to describe the array of the video pixels. Further, the right field in the drawing is a diagram illustrating the array of the panel pixels corresponding to the array of the video pixels in the left field.

Note that, in the left field of FIG. 9, for convenience, A11, B11, A21, B21, A31, and B31 are respectively assigned to the video pixels of the first row as reference signs, in order to distinguish the video pixels of the video data Vid-in. Similarly, the second to fifth rows are also denoted by reference signs as illustrated in the drawing.

In the right field of FIG. 9, for convenience, p11, p21, and p31 are assigned to the panel pixels of the first row, and p12, p22, and p32 are assigned to the panel pixels of the second row as reference signs, in order to distinguish the panel pixels.

Figure 10:
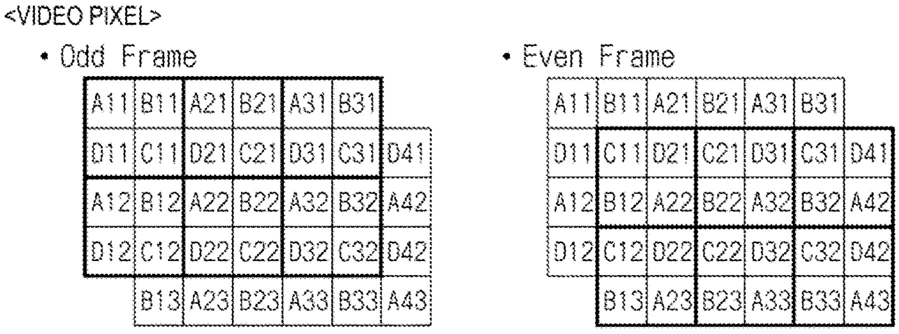
FIG. 10 is a diagram illustrating a correspondence relationship between the pixel data and the panel pixels in each of frame period in an embodiment.

FIG. 10 is a diagram illustrating the video pixels expressed by the panel pixels in the odd frame period and the even frame period. Note that, in the drawing, frames surrounded by the black thick line, which surrounds a total of four video pixels in two rows×two columns, indicates a group of the video pixels expressed by one panel pixel. The four video pixels expressed by one panel pixel are different between the odd frame period and the even frame period. More specifically, in the present embodiment, the 2×2 video pixels expressed by one panel pixel in the even frame period are shifted by one video pixel in the right direction and one video pixel in the downward direction, from the 2×2 video pixels expressed by the panel pixel in the odd frame period.

Figure 11:
FIG. 11 is a diagram illustrating an order of the pixel data supplied to the panel pixel in the embodiment.

FIG. 11 is a diagram focusing on a panel pixel p11 in particular, and illustrating an order in which the video pixels are expressed by the panel pixel p11 in each of the odd frame period and the even frame period. As illustrated in the drawing, the panel pixel p11 sequentially expresses the video pixels C11, B11, A11, and D11 in the unit periods f1-1 to f1-4 of the odd frame period, and sequentially expresses the video pixels C11, B12, A22, and D21 in the unit periods f2-1 to f2-4 of the even frame period. In other words, the order in which the video pixels are expressed by the panel pixel p11 in the odd frame period and the order in which the video pixels are expressed by the same in the even frame period are in a point symmetrical relationship about the video pixel C11.

Thus, for example, the shift direction from the projection pixel before the shift toward the projection pixel after the shift from the unit period f1-2 to the unit period f1-3 of the odd frame period is opposite to the shift direction from the projection pixel before the shift toward the projection pixel after the shift from the unit period f2-2 to the unit period f2-3 of the even frame period. Similarly, for example, the shift direction from the projection pixel before the shift toward the projection pixel after the shift from the unit period f1-3 to the unit period f1-4 of the odd frame period is opposite to the shift direction from the projection pixel before the shift toward the projection pixel after the shift from the unit period f2-3 to the unit period f2-4 of the even frame period.

Figure 12:
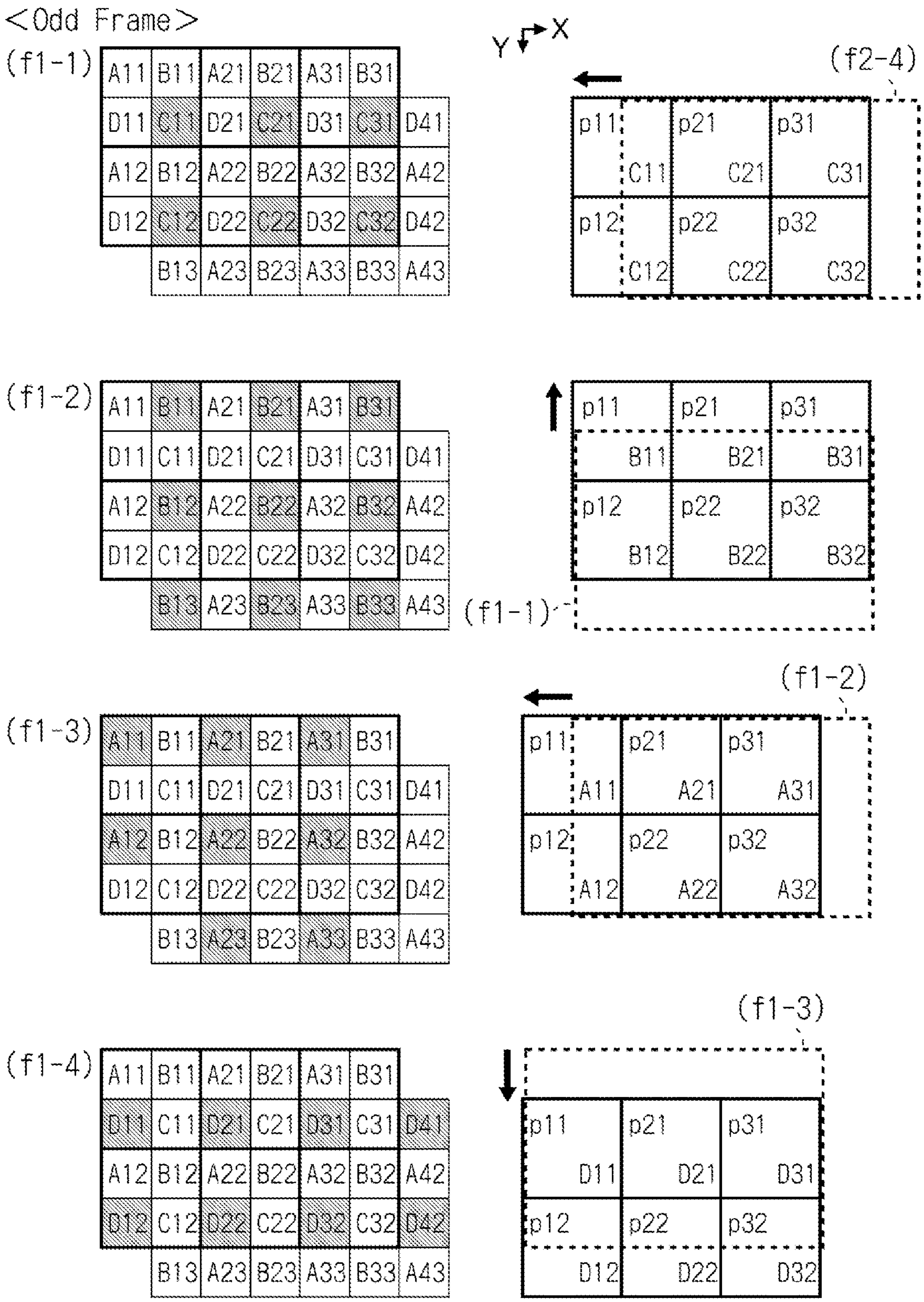
FIG. 12 is a diagram illustrating a relationship among video pixels, the panel pixels, and a projection position in an odd frame period in the embodiment.
Figure 13:
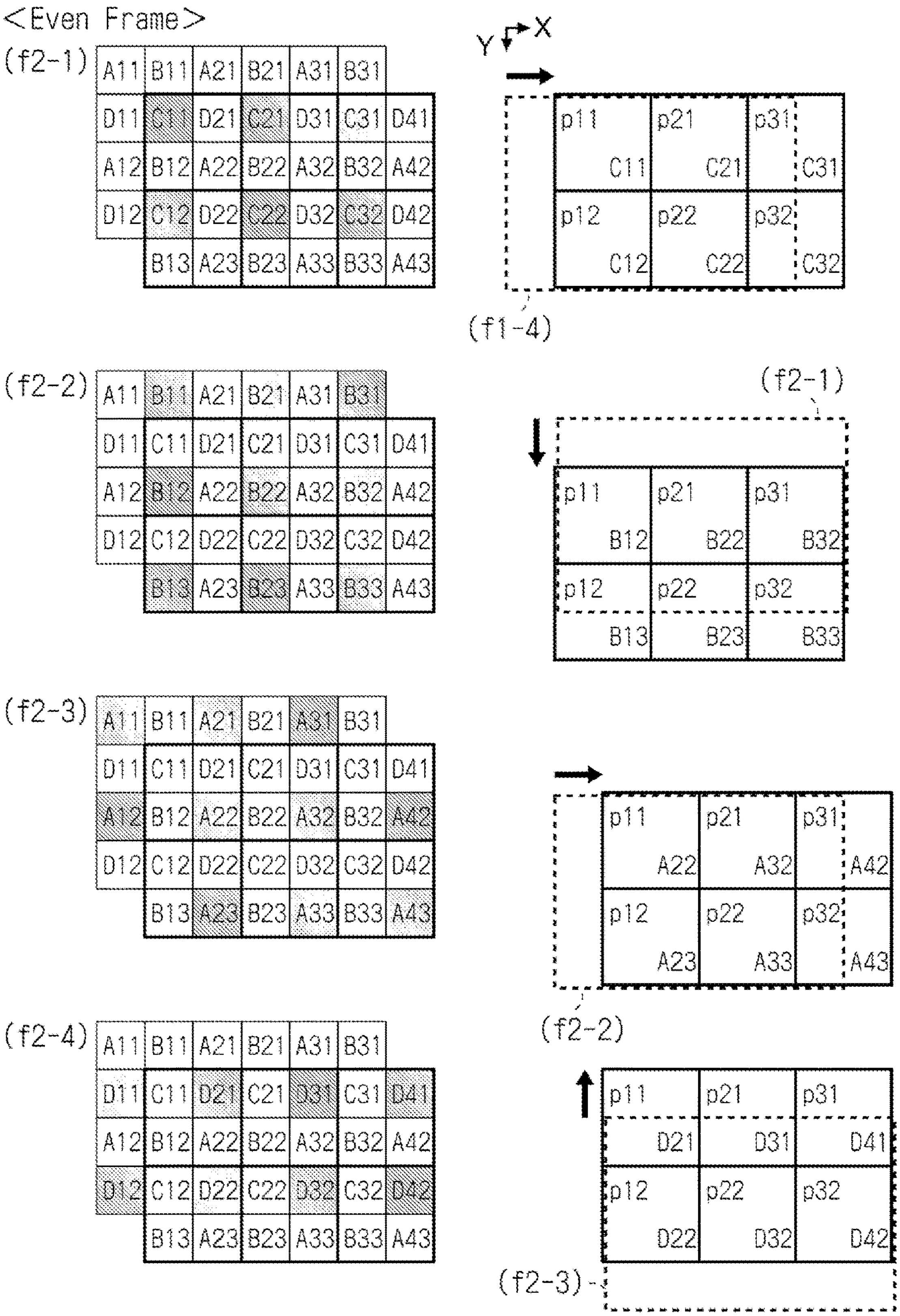
FIG. 13 is a diagram illustrating a relationship among the video pixels, the panel pixels, and a projection position in an even frame period in the embodiment.

FIG. 12 and FIG. 13 are diagrams illustrating which video pixel is expressed at which projection position by the panel pixel in the projection-type display apparatus 1 according to the embodiment. More specifically, FIG. 12 is a diagram illustrating at which projection positions the video pixels in the left field in FIG. 9 are expressed by the six panel pixels in FIG. 9 in the unit periods f1-1 to f1-4 of the odd frame period. FIG. 13 is a diagram illustrating at which projection positions the video pixels are expressed by the six panel pixels in the unit periods f2-1 to f2-4 of the even frame period.

For convenience, the projection position in the unit period f1-1 of the odd frame period is set as the reference position. As illustrated in FIG. 12, in the unit period f1-1 of the odd frame period, the panel pixels p11, p21, p31, p12, p22, and p32 express the hatched video pixels C11, C21, C31, C12, C22, and C32, respectively.

In the rear end period (vertical flyback period) of the unit period f1-1, the optical path shift element 230 shifts the projection position from the reference position in the unit period f1-1 indicated by the dashed line, in the upward direction in the drawing (direction opposite to the Y direction) by half of the panel pixel. In the next unit period f1-2, the panel pixels p11, p21, p31, p12, p22, and p32 express the hatched video pixels B11, B21, B31, B12, B22, B32, respectively.

In the rear end period of the unit period f1-2, the optical path shift element 230 shifts the projection position from the projection position in the unit period f1-2 indicated by the dashed line, in the left direction in the drawing (direction opposite to the X direction) by half of the panel pixel. In the next unit period f1-3, the panel pixels p11, p21, p31, p12, p22, and p32 express the hatched video pixels A11, A21, A31, A12, A22, and A32, respectively.

In the rear end period of the unit period f1-3, the optical path shift element 230 shifts the projection position from the projection position in the unit period f1-3 indicated by the dashed line, in the downward direction in the drawing (Y direction) by half of the panel pixel. In the next unit period f1-4, the panel pixels p11, p21, p31, p12, p22, and p32 express the hatched video pixels D11, D21, D31, D12, D22, and D32, respectively.

In the rear end period of the unit period f1-4, the optical path shift element 230 shifts the projection position from the projection position in the unit period f1-4 indicated by the dashed line, in the right direction in the drawing (X direction) by half of the panel pixel, whereby the projection position returns to the reference position. In the first unit period f2-1 of the even frame period, the panel pixels p11, p21, p31, p12, p22, and p32 express the hatched video pixels C11, C21, C31, C12, C22, and C32, respectively. In other words, the video pixels expressed by one panel pixel in the unit period 1-1 is the same as the video pixels expressed by the one panel pixel in the unit period 2-1.

In the rear end period of the unit period f2-1, the optical path shift element 230 shifts the projection position from the reference position in the unit period f2-1 indicated by the dashed line, in the downward direction in the drawing (Y direction) by half of the panel pixel. In the next unit period f2-2, the panel pixels p11, p21, p31, p12, p22, and p32 express the hatched video pixels B12, B22, B32, B13, B23, B33, respectively.

In the rear end period of the unit period f2-2, the optical path shift element 230 shifts the projection position from the projection position in the unit period f2-2 indicated by the dashed line, in the right direction in the drawing (X direction) by half of the panel pixel. In the unit period f2-3, the panel pixels p11, p21, p31, p12, p22, and p32 express the hatched video pixels A22, A32, A42, A23, A33, and A42, respectively.

In the rear end period of the unit period f2-3, the optical path shift element 230 shifts the projection position from the projection position in the unit period f2-3 indicated by the dashed line, in the upward direction in the drawing (direction opposite to the Y direction) by half of the panel pixel. In the next unit period f2-4, the panel pixels p11, p21, p31, p12, p22, and p32 express the hatched video pixels D21, D31, D41, D22, D32, and D42 respectively.

In the rear end period of the unit period f2-4, the optical path shift element 230 shifts the projection position from the projection position indicated by the dashed line, in the left direction in the drawing (direction opposite to the X direction) by half of the panel pixel, whereby the projection position returns to the reference position.

In FIG. 12, the panel pixels p11, p21, p31, p12, p22, and p32 sequentially express the video pixels C11, C21, C31, C12, C22, and C32 respectively, in the unit period 1-1. Therefore, for example, with the video pixel C11 expressed by the panel pixel p11 used as the reference, the video pixels C21 and C12 are adjacent to each other.

In this way, video pixels that are not video pixels adjacent to each other but are expressed by panel pixels in the same unit period may be described as being in the same series. In the above example, the video pixels C11, C21, C31, C12, C22 and C32 are in the same series.

The degradation of display quality due to the alignment defect will be described.

Figure 14:
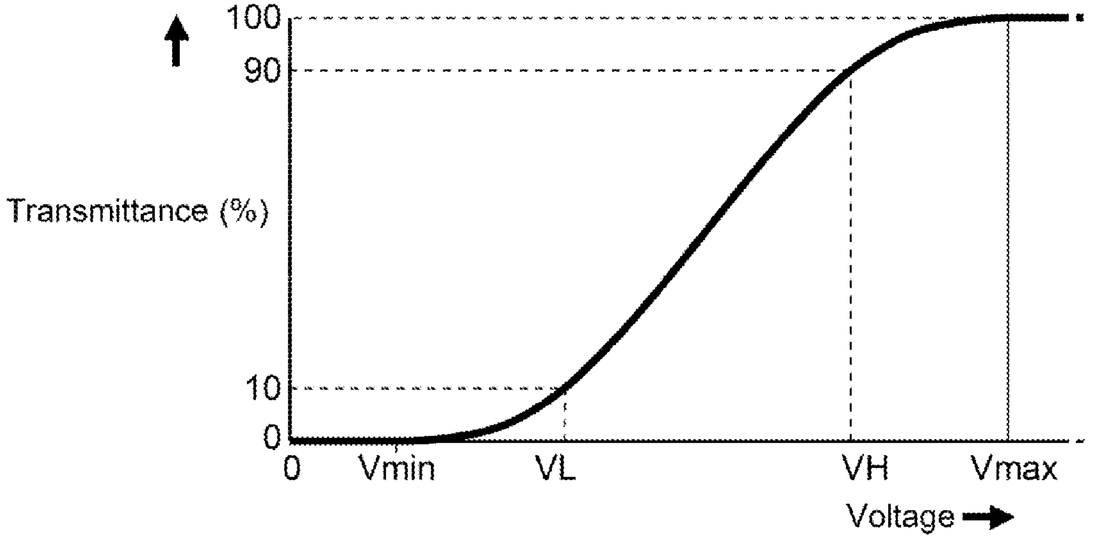
FIG. 14 is a diagram illustrating a change in pixel.

FIG. 14 is a diagram illustrating an example of applied voltage-transmittance characteristics (V-T characteristics) of the liquid crystal element 120 under the normally black mode. Under the normally black mode, the voltage applied to the liquid crystal element 120 is high in a panel pixel (bright panel pixel) in which a high gray scale level is designated and the transmittance is high. On the other hand, the voltage applied to the liquid crystal element 120 is low in a panel pixel (dark panel pixel) in which a low gray scale level is designated and the transmittance is low. The bright panel pixel and the dark panel pixel are defined as follows for convenience.

The bright panel pixel is a panel pixel in which a voltage applied to the liquid crystal element 120 including the pixel electrode 118 is higher than VH when a voltage corresponding to the gray scale level is applied to the pixel electrode 118. The dark panel pixel is a panel pixel in which a voltage applied to the liquid crystal element 120 is lower than VL. It is herein noted that, VH and VL are in a relationship of VH>VL. When the voltage applied to the liquid crystal element 120 is the voltage VL, the relative transmittance is 10%, for example. When the voltage applied to the liquid crystal element 120 is the voltage VH, the relative transmittance is 90%, for example. It should be noted that, VL and VH may be voltages corresponding to other relative transmittances.

Figure 15:
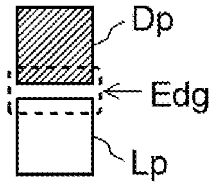
FIG. 15 is a diagram illustrating alignment defect.

As illustrated in FIG. 15, in the liquid crystal panel 100, when a bright panel pixel Lp and a dark panel pixel Dp are adjacent to each other, a voltage difference between the pixel electrodes 118 is large. As a result, an alignment defect of liquid crystal molecules is likely to occur due to an electric field (lateral electric field) along the substrate direction in the vicinity of a boundary Edg between the two pixels. In general, a larger voltage difference between the pixel electrodes 118, that is, a larger difference in gray scale level leads to a higher risk of occurrence of the alignment defect near the boundary between two adjacent panel pixels.

The degradation of display quality due to the alignment defect will be described more in detail.

In the dark panel pixel in the normally black mode, since the voltage applied to the liquid crystal element 120 is low, the vertical electric field acting in the direction perpendicular to the substrate is weak, and the liquid crystal molecules are aligned substantially only by the regulating force of an alignment film.

Therefore, when the dark panel pixel is adjacent to the bright panel pixel, the alignment of the liquid crystal molecules in the vicinity of the boundary between the dark panel pixel and the bright panel pixel is disturbed by the influence of the lateral electric field. In the state where the alignment of the liquid crystal molecules is disturbed, the liquid crystal molecules are not immediately aligned in accordance with the vertical electric field of the applied voltage, in response to an increase in voltage applied to the liquid crystal element 120. That is, since the alignment of the liquid crystal molecules is disturbed in the region near the boundary between the dark panel pixel and the adjacent bright panel pixel, thus immediate transition to a panel pixel with high transmittance cannot be achieved.

For this reason, the bright panel pixel adjacent to the dark panel pixel cannot immediately transition to a panel pixel with high transmittance in a region in the vicinity of the boundary with the dark panel pixel, and transitions to a slightly dark state and then to a state with transmittance (luminance) corresponding to a gray scale level. In the bright panel pixel adjacent to the dark panel pixel, it takes, for example, about 10 milliseconds for the disturbance of the alignment of the liquid crystal molecules to be eliminated. Thus, transition of a panel pixel that is the dark panel pixel to the bright panel pixel with the panel pixel being the bright panel pixel remaining to be the bright panel pixel after the occurrence of the disturbance of the liquid crystal molecules with the dark panel pixel and the bright panel pixel being adjacent to each other involves the disturbance of the alignment of the liquid crystal molecules remaining for about 10 milliseconds on the side of the panel pixel being the bright panel pixel. In such a period, the transmittance in the region in the vicinity of the boundary between with the adjacent panel pixel on the side of the panel pixel being the bright panel pixel.

On the other hand, in a region of the bright panel pixel under the normally black mode other than the boundary region with the dark panel pixel, since the voltage applied to the liquid crystal element 120 is high, the vertical electric field acting in the direction perpendicular to the substrate is strong, meaning that the alignment of the liquid crystal molecules is not disturbed. Therefore, in the region other than the boundary region with the dark panel pixel in the bright panel pixel, immediate change to the transmittance corresponding to the voltage applied to the liquid crystal element 120 occurs, even if the region is adjacent to the dark panel pixel.

The degradation of the display quality due to the alignment defect caused by the bright panel pixel being adjacent to the dark panel pixel will be described by taking a specific video image as an example.

Figure 16:
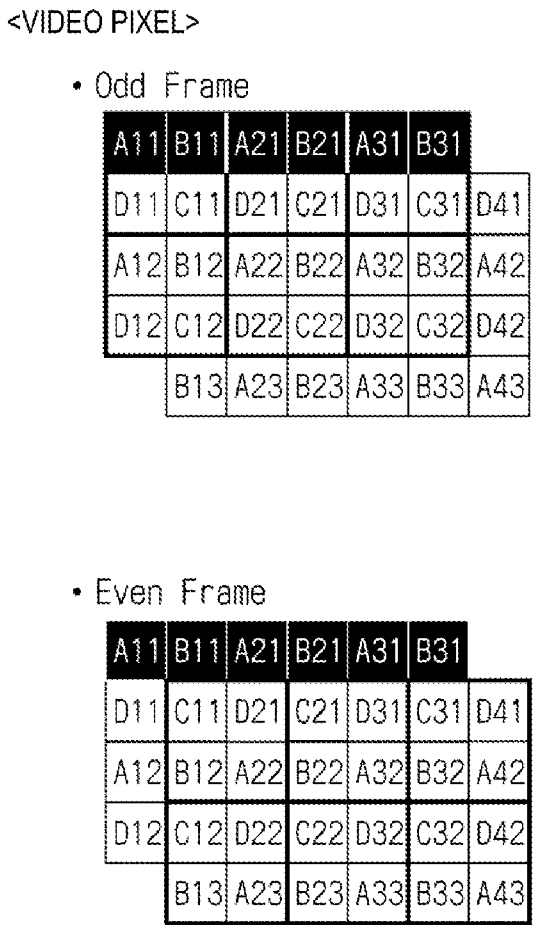
FIG. 16 is a diagram illustrating an example of a video pixel in video data.

FIG. 16 is a diagram illustrating an example of the video image designated by the video data Vid-in. The video image illustrated in this figure is a still image and is an example in which lines extending along the horizontal direction from black video pixels A11, B11, A21, B21, A31, and B31 are arrayed with white video pixels providing the background.

In a case of a still image, the video pixels in the odd frame period are the same as those in the even frame period. The white video pixel as used herein is a video pixel in which the highest (or nearly highest) gray scale level is designated for each of the three primary colors of red, green, and blue. Further, the black video pixel referred to here is a video pixel in which the lowest (or nearly lowest) gray scale level is designated for each of the three primary colors of red, green, and blue.

Figure 17:
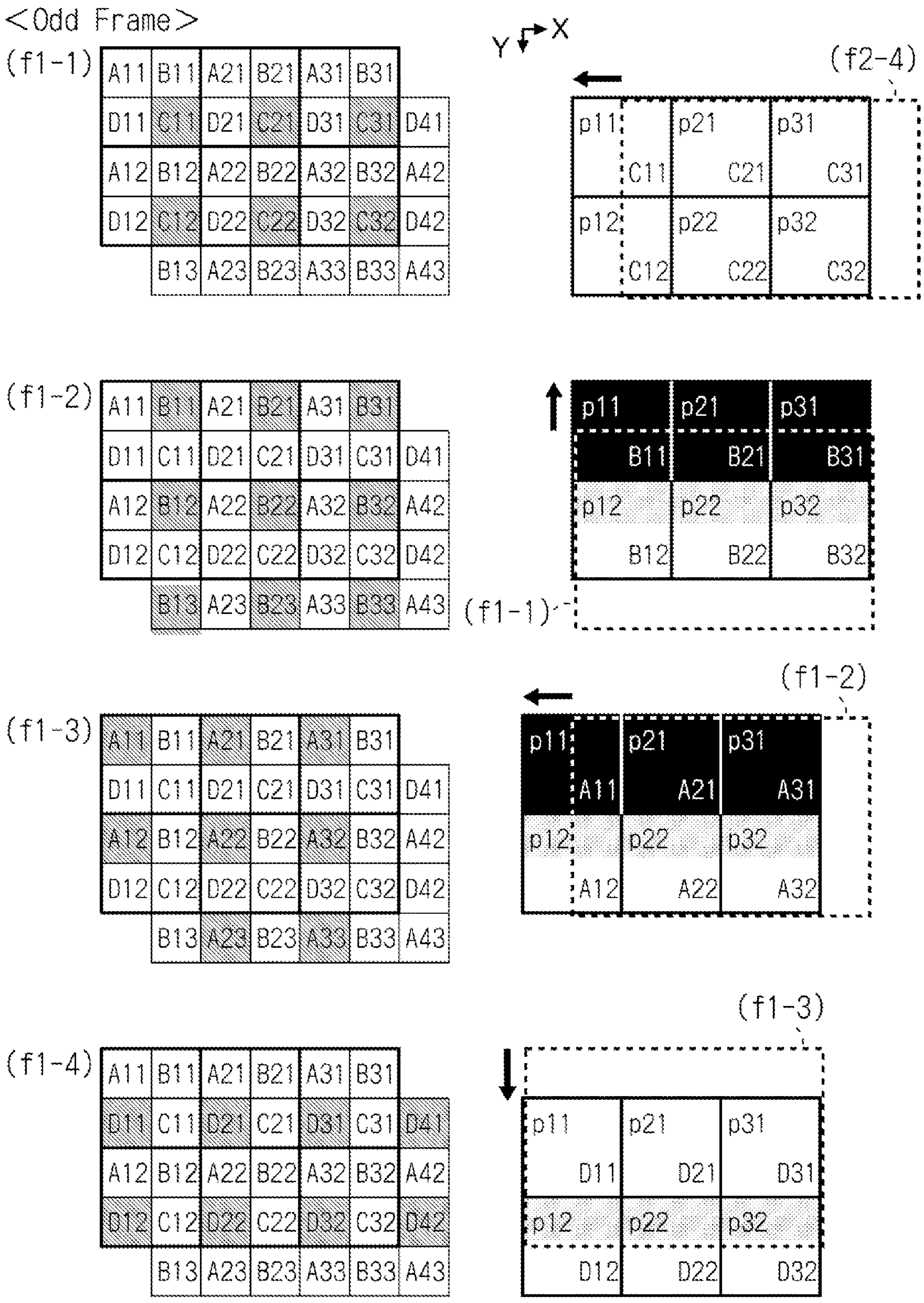
FIG. 17 is a diagram illustrating a relationship among the video pixels, the panel pixels, and projection positions in the odd frame period in a case where the video image is displayed.
Figure 18:
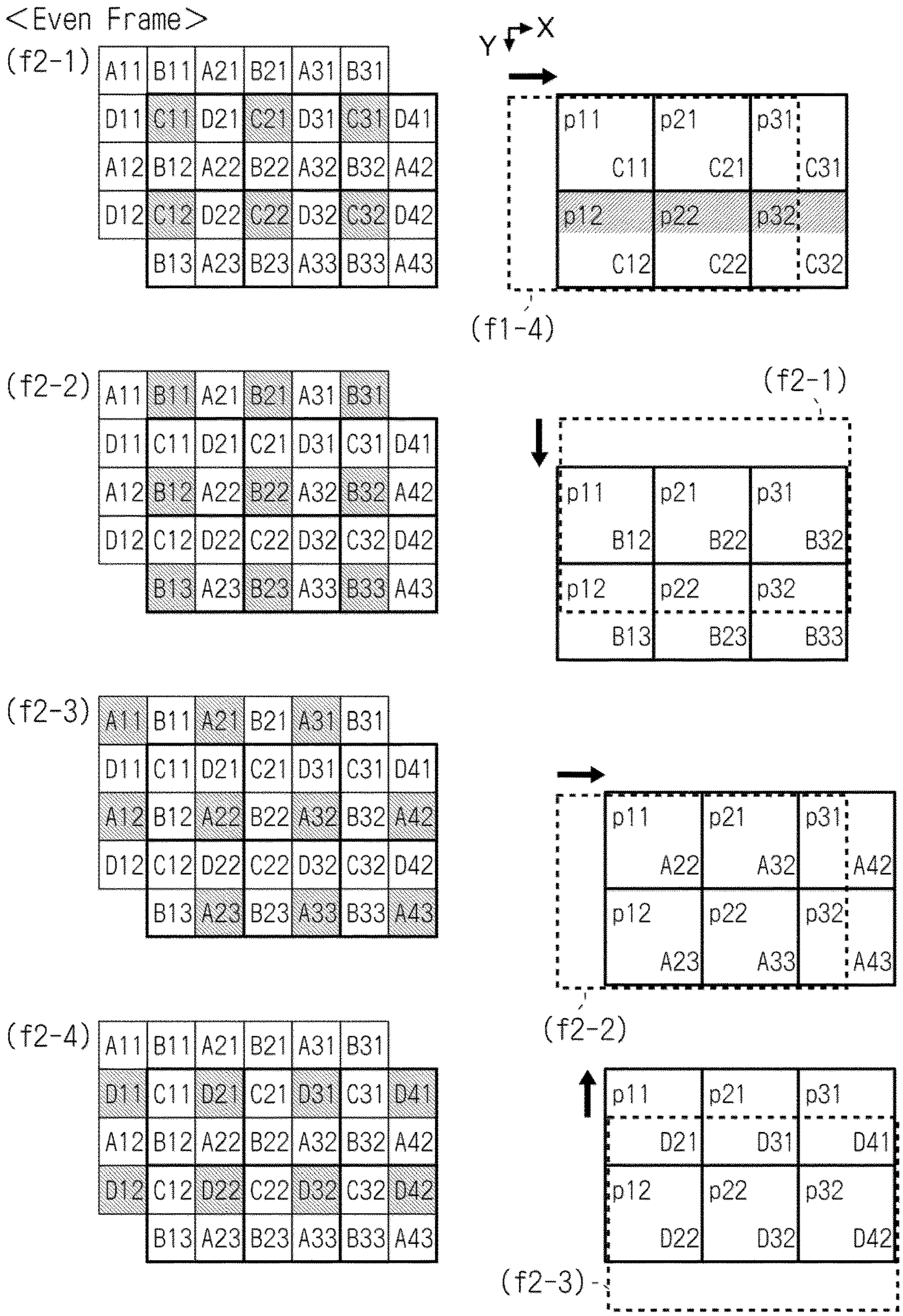
FIG. 18 is a diagram illustrating a relationship among the video pixels, the panel pixels, and projection positions in the even frame period in a case where the video image is displayed.

FIG. 17 is a diagram illustrating which video pixel is expressed at which projection position by the panel pixel in the unit periods f1-1 to f1-4 of the odd frame period, with the video pixel as illustrated in FIG. 16. FIG. 18 is a diagram illustrating which video pixel is expressed at which projection position by the panel pixel in the unit periods f2-1 to f2-4 of the even frame period, with the video pixel as illustrated in FIG. 16.

In the unit period f1-1, the panel pixels p11, p21, and p31 express the white video pixels C11, C21, and C31 in this order, and the panel pixels p12, p22, and p32 express the white video pixels C12, C22, and C32 in this order. That is, in the unit period f1-1, the panel pixels p11, p21, p31, p12, p22, and p32 are the bright panel pixels.

In the unit period f1-2, the panel pixels p11, p21, and p31 express the black video pixels B11, B21, and B31 in this order, and the panel pixels p12, p22, and p32 express the white video pixels B12, B22, and B32 in this order. Thus, in the unit period f1-2, the panel pixels p11, p21, and p31 are dark panel pixels, and the panel pixels p12, p22, and p32 are bright panel pixels. Therefore, in the unit period f1-2, a strong lateral electric field is generated between the panel pixels p11 and p12, between the panel pixels p21 and p22, and between the panel pixels p31 and p32. Therefore, as indicated by hatching in the drawing, the transmittance of the regions of the panel pixels p12, p22, and p32 on the side of the panel pixels p11, p21, and p31 does not immediately become high due to the alignment defect. Instead, the slightly dark state is achieved in which the panel pixels p12, p22, and p32 are slightly dark on average.

In the unit period f1-3, the panel pixels p11, p21, and p31 express the black video pixels A11, A21, and A31 in this order, and the panel pixels p12, p22, and p32 express the white video pixels A12, A22, and A32 in this order. Thus, in the unit period f1-2, the panel pixels p11, p21, and p31 are dark panel pixels, and the panel pixels p12, p22, and p32 are bright panel pixels. Therefore, a strong lateral electric field is generated between the panel pixels p11 and p12, between the panel pixels p21 and p22, and between the panel pixels p31 and p32. Therefore, as indicated by hatching in the drawing, the transmittance of the regions of the panel pixels p12, p22, and p32 on the side of the panel pixels p11, p21, and p31 does not immediately become high due to the alignment defect. Instead, the slightly dark state is achieved in which the panel pixels p12, p22, and p32 are slightly dark on average.

In the unit period f1-4, the panel pixels p11, p21, and p31 express the white video pixels A11, A21, and A31 in this order, and the panel pixels p12, p22, and p32 express the white video pixels A12, A22, and A32 in this order. That is, in the unit period f1-4, the panel pixels p11, p21, p31, p12, p22, and p32 should each transmit to the bright panel pixels.

Still, a certain amount of time is required for eliminating the impact of the alignment defect of the panel pixels p12, p22, and p32. Thus, as indicated by hatching in the drawing, the transmittance of the regions of the panel pixels p12, p22, and p32 on the side of the panel pixels p11, p21, and p31 does not immediately become high due to the alignment defect. Instead, the slightly dark state is achieved in which the panel pixels p12, p22, and p32 are slightly dark on average.

In the unit period f2-1, the panel pixels p11, p21, and p31 express the white video pixels C11, C21, and C31 in this order, and the panel pixels p12, p22, and p32 express the white video pixels C12, C22, and C32 in this order. That is, in the unit period f2-1, the panel pixels p11, p21, p31, p12, p22, and p32 should each transmit to the bright panel pixels.

Still, the impact of the alignment defect of the panel pixels p12, p22, and p32 is remaining as in the unit period f1-4. Thus, as indicated by hatching in the drawing, the transmittance of the regions of the panel pixels p12, p22, and p32 on the side of the panel pixels p11, p21, and p31 does not immediately become high due to the alignment defect. Instead, the slightly dark state is achieved in which the panel pixels p12, p22, and p32 are slightly dark on average.

In the unit period f2-2, the panel pixels p11, p21, and p31 express the white video pixels D21, D31, and D41 in this order, and the panel pixels p12, p22, and p32 express the white video pixels D22, D32, and D42 in this order. While the panel pixels p11, p21, and p31 are in the slightly dark state due to the alignment defect in the unit period 2-1, the unit period 2-2 and after are expected to be free of the alignment defect. Therefore, in the unit period 2-2, the panel pixels p12, p22, and p32 are the bright panel pixels as designated.

In the unit periods f2-3 to f2-4 of the even frame period, the panel pixels p11, p21, p31, p12, p22, and p32 are all bright panel pixels.

Figure 19:
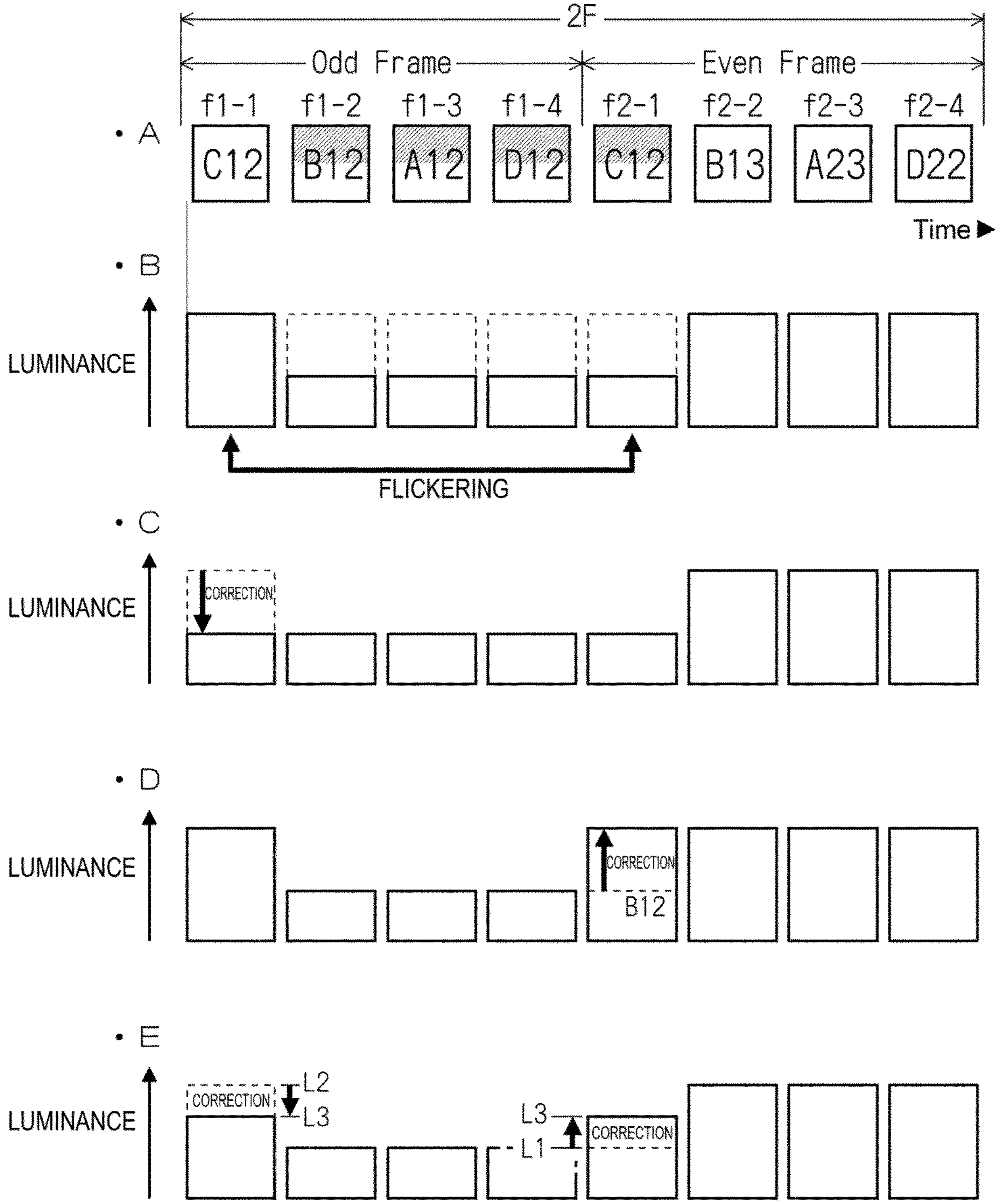
FIG. 19 is a diagram illustrating correction in the embodiment.

FIG. 19 is a diagram focusing on the panel pixel p12 and illustrating how the luminance of the panel pixel p12 changes in the odd frame period and the even frame period, with the video pixel as illustrated in FIGS. 16, 17, and 18.

As indicated by A in the figure, the panel pixel p12 is a bright panel pixel in the unit period f1-1 in the odd frame period and has a luminance corresponding to the gray scale level, and in the unit periods f1-2 and f1-3, has a luminance lower than the luminance corresponding to the gray scale level due to the alignment defect as a result of being adjacent to the dark panel pixel. Further, since the impact of the alignment defect is not eliminated for the panel pixel p12 in the unit periods f1-4 and f2-1, the luminance of the panel pixel p12 is lower than the luminance corresponding to the gray scale level. In addition, the panel pixel p12 has a luminance corresponding to the bright panel pixel in each of the unit periods f2-2 to f2-4.

Therefore, as indicated by B in the drawing, the panel pixel p12 does not reach the designated luminance due to the alignment defect in the unit period f2-1 of the even frame period.

The panel pixel p12 should have a luminance corresponding to the gray scale level designated by the video pixel C12 in the unit period 2-1, and should have a luminance corresponding to the gray scale level designated by the video pixel C12 in the unit period 1-1.

The video pixel C12 designates the same gray scale level in the unit periods f1-1 and f2-1. However, the luminance of the panel pixel p12 is slightly lower than the designated luminance due to the alignment defect in the unit period 2-1, and becomes the designated luminance in the unit period 1-1.

For this reason, in the panel pixel p12, a state in which the luminance is lower than that designated by the gray scale level in the unit period 2-1 and a state in which the luminance is as designated by the gray scale level in the unit period 1-1 appear alternately every four unit periods, and are visually recognized as flickering.

Therefore, in the present embodiment, as indicated by C in the drawing, the gray scale level of the video pixel C12 in the unit period 1-1 is corrected to match the luminance of the panel pixel which becomes dark due to the occurrence of the alignment defect in the unit period 2-1, whereby the flickering is suppressed.

Such correction will be considered. Specifically, first, in a case where a bright panel pixel and a dark panel pixel are adjacent to each other in one unit period, a lateral electric field that causes the alignment defect is generated between the bright panel pixel and the dark panel pixel. Second, since the influence of the lateral electric field generated in the panel pixel is not eliminated in the bright video pixel displayed within a predetermined time after the occurrence of the alignment defect caused by the lateral electrolysis, the luminance of the bright video pixel is reduced due to the influence of the alignment defect. Therefore, third, when the video pixel affected by the alignment defect is displayed without the bright panel pixel and the dark panel pixel being adjacent to each other in the next frame period, the video pixel is not affected by the lateral electrolysis and thus has a luminance corresponding to the gray scale level. When the state in which the alignment defect occurs in the frame period and the state in which the alignment defect does not occur in the frame period subsequent to the frame period are achieved in the same video pixel, such states are visually recognized as flickering. Fourth, in order to suppress the flickering, in the present embodiment, the gray scale level of the video pixel is corrected as follows. That is, for the same video pixel as the video pixel displayed by the panel pixel under the alignment defect, the gray scale level expressed after the elapse of one frame period (after the elapse of four unit periods) is corrected so as to be close to the gray scale level corresponding to the luminance of the panel pixel under the alignment defect.

The amount of decrease in the luminance of the panel pixel under the alignment defect is substantially determined by the intensity of the lateral electric field (the difference in gray scale level between the adjacent panel pixels) and the gray scale level of the video pixel to be expressed by the panel pixel under the alignment defect caused by the lateral electrode. In view of this, the amount of decrease in luminance can be obtained by calculation using two arguments, i.e., the difference in gray scale level and the gray scale level, or by using a table. Further, the amount of decrease in luminance can be replaced by the amount of decrease in gray scale level. The amount of decrease in the gray scale level corresponds to the correction amount.

Such specific correction processing for the gray scale level is executed in the processing circuit 22, for example, as follows.

As first processing, the processing circuit 22 determines a state in which a bright panel pixel and a dark panel pixel are adjacent to each other based on whether or not a difference in gray scale level between adjacent video pixels in the same series is equal to or larger than a first threshold. As second processing, the processing circuit 22 determines whether the dark panel pixel changes to the bright panel pixel in the next unit period, and determines the video pixel affected after the occurrence of the lateral electrolysis in the panel pixel.

As third processing, the processing circuit 22 determines that flickering occurs when the difference between in the gray scale level between the video pixel under the alignment defect and the video pixel at the same position displayed in the next frame period is equal to or less than a second threshold value.

As fourth processing, when it is determined that flickering occurs by the first to the third processing, the processing circuit 22 corrects through conversion from the amount of decrease in transmittance with respect to a gray scale level to be supplied to a panel pixel displaying the video pixel under the alignment defect occurs in the frame period, the gray scale level to be supplied to another panel pixel displaying the video pixel to be displayed in the next frame period.

Note that the second processing and/or the third processing can be omitted in reducing flickering due to alignment defect.

According to such correction, as indicated by C in FIG. 19, the gray scale level of the video pixel C12 corresponding to the panel pixel p12 in the unit period f1-1 is corrected, and the luminance of the panel pixel p12 in the unit period 2-1 is made equal to the luminance as a resulting of darkening by the alignment defect of the panel pixel p11 in the unit period f1-1. Thus, with the present embodiment, the flickering can be suppressed.

In the embodiment, when the panel pixel p12 fails to have the luminance at the gray scale level designated by the video pixel C11 due to the alignment defect in the unit period 2-1, the gray scale level designated by the pixel data of the video pixel C12 corresponding to the panel pixel p12 in the unit period f1-1 after the elapse of four unit periods is corrected to be close to the luminance under the alignment defect. However, the embodiment is not limited to this configuration.

For example, as indicated by D in FIG. 19, the processing circuit 22 may be configured to correct the gray scale level of the video pixel C12 corresponding to the panel pixel p12 in the unit period 2-1.

Specifically, when it is determined that the panel pixel p12 in which the alignment defect has occurred in the unit period 2-1 does not reach the luminance of the gray scale level designated by the pixel data of the video pixel C12, the gray scale level of the video pixel C12 is corrected to bring the luminance close to the luminance designated by the gray scale level of the video pixel C12 expressed by the same panel pixel p12 in the unit period f1-1.

According to such correction, the gray scale level of the video pixel C12 is corrected in anticipation of the decrease in luminance due to the alignment defect in the unit period f2-1, and is made equal to the luminance in the unit period f1-1, whereby flickering can be suppressed.

Further, according to such correction, the luminance of the panel pixel p12 in the unit period f2-1 can be the original luminance designated by the gray scale level of the video pixel C12.

For example, as indicated by E in FIG. 19, the processing circuit 22 may be configured to correct both the gray scale level of the video pixel C12 corresponding to the panel pixel p12 in the unit period 2-1 and the gray scale level of the video pixel C12 corresponding to the panel pixel p12 in the unit period 1-1.

For example, the actual luminance of the panel pixel p12 is defined as L1, in a case where the data signal converted from the video pixel C12 is supplied to the panel pixel p12 in the unit period 2-1. The actual luminance of the panel pixel p12 is defined as L2, in a case where the data signal converted from the video pixel C12 is supplied to the panel pixel p12 in the unit period 1-1. The average value of the luminance L1 and the luminance L2 is defined as L3.

The processing circuit 22 corrects the gray scale level of the video pixel C12 so that the luminance L1 of the panel pixel p12 in the unit period 2-1 reaches the average value L3, and corrects the gray scale level of the video pixel C12 so that the luminance L2 of the panel pixel p12 in the unit period 1-1 reaches the average value L3.

With such correction, even if an alignment defect occurs in the panel pixel p12 in the unit period f2-1, the luminance of the panel pixel p12 is made equal to the luminance of the panel pixel p11 in the unit period 1-1, whereby flickering can be suppressed.

Further, according to such correction, the luminance of the panel pixel p12 in the unit period f2-1 can be made close to the original luminance designated by the gray scale level of the video pixel C12.

Here, a description is given, focusing on the panel pixel p12 when the video image illustrated in FIG. 16 is visually recognized, on correction of the gray scale level of the video pixel C12 corresponding to the panel pixel p12 in the unit period f2-1 and/or the gray scale level of the video pixel p12 corresponding to the panel pixel C12 in the unit period 1-1.

In the video image illustrated in FIG. 16, similar correction is performed on the gray scale level of the video pixel C22 corresponding to the panel pixel p22.

Similar correction is performed on the gray scale level of the video pixel C32 corresponding to the panel pixel p32.

In the embodiment and the modification described above (hereinafter referred to as "embodiment and the like"), various modifications or applications are possible as described below.

In the embodiment, a configuration is adopted in which one frame period is divided into four unit periods. In other words, an example is described where k as the number of unit periods included in one frame period is four. Note that k is not limited to "4", and may be any number of "2" or greater.

In the embodiment and the like, a case in which as a white background, a line formed by black video pixels arrayed in the lateral direction is displayed as a video image is described for the flickering caused by the alignment defect. It should be noted that, the flickering also occurs in a case in which as a white background, a line formed by black video pixels arrayed in the vertical direction is displayed.

In the embodiment, in order to suppress flickering of the same video pixel expressed in the same panel pixel, the gray scale level of one or both of the odd frame period and the even frame period is corrected, but the present disclosure is not limited thereto. Similar correction may be performed when a luminance difference occurs in the same video pixel expressed by different panel pixels in frame periods.

In the embodiment and the like, the period in which the levels of the control signals P_x and P_y supplied to the optical path shift element 230 change is the rear end period corresponding to the vertical scanning flyback period in each of the unit periods f1-1 to f1-4 and f2-1 to f2-4. However, as described above, the shift of the projection position by the optical path shift element 230 may not occur as designated by the levels of the control signals P_x and P_y, and there may be a time delay. In such a case, a change in the levels of the control signals P_x and P_y may start in anticipation of the time delay, so that the image formed by the liquid crystal panel 100 in a unit period is shifted to a projection position corresponding to that unit period, for example.

For example, the following aspects are understood from the modes illustrated above.

A projection-type display apparatus according to one aspect (Aspect 1) includes: a liquid crystal panel including a panel pixel; an optical path shift element configured to shift a position of a projection pixel every k unit periods, from a first unit period to a k-th unit period, included in one frame period, the projection pixel being projected from the panel pixel, k being an integer of 2 or greater; and a display control circuit configured to control the liquid crystal panel and the optical path shift element, wherein the display control circuit is configured to supply a data signal corresponding to a gray scale level designated by pixel data forming video data to the panel pixel for each unit period, control the optical path shift element to shift the position of the projection pixel for each unit period, control the optical path shift element so that a position of the projection pixel in a first frame period and a position of the projection pixel in a second frame period after the first frame period include different positions, and when in the first frame period, a difference in gray scale level between pixel data corresponding to a first panel pixel and pixel data corresponding to a second panel pixel is equal to or larger than a threshold in one unit period, the first panel pixel and the second panel pixel being adjacent to each other, correct at least one of a gray scale level of first pixel data corresponding to the first panel pixel in a unit period subsequent to the one unit period or a gray scale level of second pixel data corresponding to a panel pixel to which the first pixel data is supplied in the second frame period, so as to reduce a difference in luminance between a panel pixel to which the first pixel data is supplied in the subsequent unit period and a panel pixel to which the second pixel data is supplied in the second frame period.

According to Aspect 1, flickering due to alignment defect can be suppressed.

When the difference in gray scale level between the video pixels respectively corresponding to the first panel pixel and the second panel pixel adjacent to each other is equal to or larger than the threshold in one unit period, the first panel pixel is a panel pixel to which a low voltage is applied, and the second panel pixel is a panel pixel to which a high voltage is applied.

In a specific aspect (Aspect 2) of Aspect 1, the display control circuit is configured to correct the gray scale level of the first pixel data in the subsequent unit period, and not correct the gray scale level of the second pixel data in the second frame period.

In a specific aspect (Aspect 3) of Aspect 1, the display control circuit configured to not correct the gray scale level of the first pixel data in the subsequent unit period, and correct the gray scale level of the second pixel data in the second frame period.

In a specific aspect (Aspect 4) of Aspect 1, the display control circuit is configured to correct the gray scale level of the first pixel data in the subsequent unit period, and correct the gray scale level of the second pixel data in the second frame period.

In a specific aspect (Aspect 5) of Aspect 1, when in the first frame period, the difference in gray scale level between the pixel data supplied to the first panel pixel and the pixel data supplied to the second panel pixel is equal to or larger than the threshold in one unit period, and the gray scale level of the pixel data supplied to the first panel pixel is higher than the gray scale level of the pixel data supplied to the second panel pixel, the first pixel data is supplied to the first panel pixel in the first frame period, and the second pixel data is supplied to the first panel pixel in the second frame period.

In a specific aspect (Aspect 6) of any one of Aspects 1 to 5, the display control circuit supplies to the liquid crystal panel, a data signal corresponding to same pixel data and performs control to position the projection pixel at a same position in each of a first unit period in the first frame period and a first unit period in the second frame period, and controls the optical path shift element so that each position of the projection pixel in a unit period other than the first unit period in the first frame period is different from each position of the projection pixel in a unit period other than the first unit period in the second frame period.

In a specific aspect (Aspect 7) of Aspect 6, the display control circuit controls the optical path shift element so that a direction of shift from a position of the projection pixel before the shift toward a position of the projection pixel after the shift from a second unit period to a k-th unit period in the first frame period is opposite to a direction of shift from a position of the projection pixel before the shift toward a position of the projection pixel after the shift from a second unit period to a k-th unit period in the second frame period.

What is claimed is:

1. A projection-type display apparatus, comprising: a liquid crystal panel including a panel pixel; an optical path shift element configured to shift a position of a projection pixel every k unit periods, from a first unit period to a k-th unit period, included in one frame period, the projection pixel being projected from the panel pixel, k being an integer of 2 or greater; and a display control circuit configured to control the liquid crystal panel and the optical path shift element, wherein the display control circuit is configured to supply a data signal corresponding to a gray scale level designated by pixel data forming video data, to the panel pixel for each unit period, control the optical path shift element to shift the position of the projection pixel for each unit period, control the optical path shift element so that a position of the projection pixel in a first frame period and a position of the projection pixel in a second frame period after the first frame period include different positions, and when in the first frame period, a difference in gray scale level between pixel data corresponding to a first panel pixel and pixel data corresponding to a second panel pixel is equal to or larger than a threshold in one unit period, the first panel pixel and the second panel pixel being adjacent to each other, correct at least one of a gray scale level of first pixel data corresponding to the first panel pixel in a unit period subsequent to the one unit period or a gray scale level of second pixel data corresponding to a panel pixel to which the first pixel data is supplied in the second frame period, so as to reduce a difference in luminance between a panel pixel to which the first pixel data is supplied in the subsequent unit period and a panel pixel to which the second pixel data is supplied in the second frame period.

2. The projection-type display apparatus according to claim 1, wherein the display control circuit is configured to correct the gray scale level of the first pixel data in the subsequent unit period, and not correct the gray scale level of the second pixel data in the second frame period.

3. The projection-type display apparatus according to claim 1, wherein the display control circuit is configured to not correct the gray scale level of the first pixel data in the subsequent unit period, and correct the gray scale level of the second pixel data in the second frame period.

4. The projection-type display apparatus according to claim 1, wherein the display control circuit is configured to correct the gray scale level of the first pixel data in the subsequent unit period, and correct the gray scale level of the second pixel data in the second frame period.

5. The projection-type display apparatus according to claim 1, wherein when in the first frame period, the difference in gray scale level between the pixel data corresponding to the first panel pixel and the pixel data corresponding to the second panel pixel is equal to or larger than the threshold in one unit period, and the gray scale level of the pixel data supplied to the first panel pixel is higher than the gray scale level of the pixel data supplied to the second panel pixel, the first pixel data is supplied to the first panel pixel in the first frame period, and the second pixel data is supplied to the first panel pixel in the second frame period.

6. The projection-type display apparatus according to claim 1, wherein the display control circuit is configured to supply, to the liquid crystal panel, a data signal corresponding to same pixel data and perform control to position the projection pixel at a same position in each of a first unit period in the first frame period and a first unit period in the second frame period, and control the optical path shift element so that each position of the projection pixel in a unit period other than the first unit period in the first frame period is different from each position of the projection pixel in a unit period other than the first unit period in the second frame period.

7. The projection-type display apparatus according to claim 6, wherein the display control circuit is configured to control the optical path shift element so that a direction of shift from a position of the projection pixel before the shift toward a position of the projection pixel after the shift from a second unit period to a k-th unit period in the first frame period is opposite to a direction of shift from a position of the projection pixel before the shift toward a position of the projection pixel after the shift from a second unit period to a k-th unit period in the second frame period.

* * * * *